United States Patent
Hawkins et al.

(10) Patent No.: US 8,800,521 B2
(45) Date of Patent: Aug. 12, 2014

(54) ELECTRIC VEHICLE FLUID PREHEATER

(75) Inventors: Shawn Scott Hawkins, Shelby Twp, MI (US); Christopher J. Twarog, Ferndale, MI (US); Paul F. Turnbull, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 13/331,383

(22) Filed: Dec. 20, 2011

(65) Prior Publication Data

US 2013/0152892 A1   Jun. 20, 2013

(51) Int. Cl.
 *B60H 1/03* (2006.01)

(52) U.S. Cl.
 USPC .............. 123/142.5 R; 180/65.1; 180/65.31; 123/142.5 E

(58) Field of Classification Search
 CPC ........ F02N 19/04; F02N 19/10; F01M 5/001; F01M 5/021; F01M 2005/021
 USPC .......... 123/142.5 R, 142.5 E, 196 AB, 41.31; 180/65.1, 65.28, 65.285, 65.29, 65.31; 310/52–54
 See application file for complete search history.

(56) References Cited

U.S. PATENT DOCUMENTS

| | | | | |
|---|---|---|---|---|
| 4,532,894 A | * | 8/1985 | Wulf et al. | 123/142.5 E |
| 5,251,588 A | * | 10/1993 | Tsujii et al. | 123/142.5 R |
| 5,255,733 A | * | 10/1993 | King | 165/299 |
| 5,291,960 A | * | 3/1994 | Brandenburg et al. | 180/65.27 |
| 5,345,761 A | * | 9/1994 | King et al. | 60/274 |
| 5,531,285 A | * | 7/1996 | Green | 180/65.25 |
| 5,950,752 A | * | 9/1999 | Lyons | 180/65.22 |
| 6,124,644 A | * | 9/2000 | Olson et al. | 290/1 B |
| 6,196,177 B1 | * | 3/2001 | VanderBok | 123/142.5 E |
| 6,601,545 B1 | * | 8/2003 | Hohl | 123/41.31 |
| 6,892,541 B2 | * | 5/2005 | Suzuki | 60/706 |

FOREIGN PATENT DOCUMENTS

| | | |
|---|---|---|
| DE | 10215686 A1 | 10/2003 |
| DE | 102008040812 A1 | 2/2010 |
| DE | 102011004624 A1 | 8/2012 |

* cited by examiner

*Primary Examiner* — Hung Q Nguyen

(74) *Attorney, Agent, or Firm* — Quinn Law Group, PLLC

(57) ABSTRACT

An electric vehicle powertrain includes a battery configured to couple with an external power source, a power plant including at least one three-phase electric motor, and a power controller configured to receive electrical energy from the battery and to controllably provide electrical energy to the at least one electric motor. The electric motor includes a stator having a plurality of electrical windings and a rotor having a magnetic field orientation, with the rotor being configured to rotate relative to the stator. The power controller is configured to warm an engine fluid by determining the position of the rotor relative to the stator; determining a DC current for each of the three motor phases such that the electromagnetic field of the stator mirrors the magnetic field orientation of the rotor; and by providing the determined DC currents to the electric motor to resistively heat the fluid.

18 Claims, 2 Drawing Sheets

ELECTRIC VEHICLE FLUID PREHEATER

TECHNICAL FIELD

The present invention relates generally to a system and method for preheating engine fluid in an electric vehicle powertrain.

BACKGROUND

Electric vehicles generally include one or more electric fraction motors that can be propelled using a controlled three-phase alternating current power source. To mitigate the detrimental effects of friction, fluid lubricants may be circulated within the motor housing to wash any associated gears, bearings, and/or electrical windings. After prolonged periods of inactivity, particularly in cold environments, these lubricants/fluids may cool below a desirable operating temperature range. Such cooling may increase fluid viscosity and provide greater resistance to motor operation. This increased fluid resistance may require additional energy to overcome, which may be counterproductive to the goal of maximizing total range/time between recharges.

SUMMARY

An electric vehicle powertrain includes a battery configured to couple with an external power source, a power plant including at least one three-phase electric motor, and a power controller configured to receive electrical energy from the battery and to provide electrical energy to the at least one electric motor in a controlled manner. The electric motor includes a stator having a plurality of electrical windings and a rotor having a magnetic field orientation, with the rotor being configured to rotate relative to the stator.

The power controller may be configured to warm an engine fluid by determining the position of the rotor relative to the stator; determining a DC current for each of the three motor phases such that the electromagnetic field of the stator mirrors the magnetic field orientation of the rotor; and by providing the determined DC currents to the electric motor to resistively heat the fluid.

The powertrain may include a fluid circuit in communication with the electric motor, along with a fluid pump to circulate the engine fluid within the fluid circuit. The fluid may be, for example, a coolant fluid or an engine oil. A temperature sensor may be in thermal communication with the fluid circuit and configured to monitor a temperature of the fluid. In one configuration, the power controller may be configured to provide the respective DC currents to the electric motor only if the sensed temperature of the fluid is below a predefined threshold.

The power controller may further be configured to monitor a state of charge of the battery, and may only provide the respective DC currents to the electric motor if the state of charge of the battery is above a predefined threshold.

Additionally, a method of pre-warming an engine fluid may include receiving an activation request from a user, comparing a state of charge of a battery to a charging threshold, energizing a three-phase electric traction motor with a DC current in response to the activation request, and transferring thermal energy from the three-phase electric traction motor to the engine fluid. In one configuration, the three-phase electric traction motor may only be energized if the state of charge of the battery exceeds the charging threshold.

Energizing a three-phase electric traction motor with a DC current may include determining the angular position of a rotor of the traction motor relative to a stator of the electric traction motor, determining a DC current for each of the three electrical phases of the three-phase electric traction motor such that the magnetic field of the stator mirrors the magnetic field of the rotor, and providing each determined DC current to the respective phase of the electric traction motor. The energizing of the traction motor may be performed such that the DC current does not induce an output torque of the motor. Additionally, transferring thermal energy from the three-phase electric traction motor to the engine fluid may include pumping the engine fluid into thermal communication with the three-phase electric traction motor.

The method may further include monitoring an angular position of the rotor, and removing the supply of DC current to the electric traction motor if a change in angular position is detected. Likewise, the method may include monitoring a temperature of the engine fluid using a temperature sensor, and removing the supply of DC current to the electric traction motor if the temperature is greater than or equal to a threshold.

The above features and advantages and other features and advantages of the present invention are readily apparent from the following detailed description of the best modes for carrying out the invention when taken in connection with the accompanying drawings.

DETAILED DESCRIPTION

Figure 1:
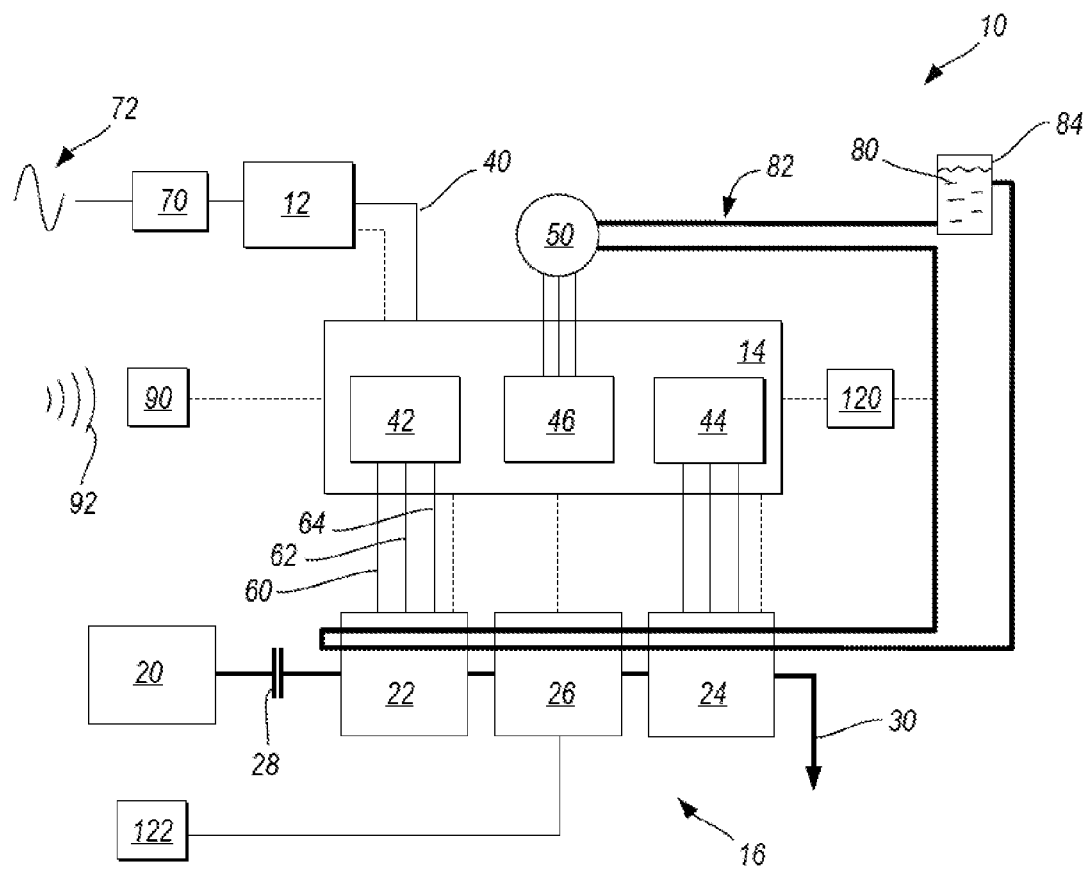
FIG. 1 is schematic illustration of an electric vehicle powertrain.

Referring to the drawings, wherein like reference numerals are used to identify like or identical components in the various views, FIG. 1 schematically illustrates a vehicle powertrain 10 that includes at least one electric motor (hereinafter referred to as an electric vehicle powertrain 10). While FIG. 1 specifically represents the electric vehicle powertrain 10 in a hybrid electric configuration, it should be understood that the present invention may equally be used with an electric vehicle powertrain 10 configured as a pure electric vehicle (EV). A "hybrid electric" configuration, as used herein, broadly includes any vehicle powertrain that has two or more sources of power, one of which being an electric motor, that can be used for purposes of vehicle propulsion. Some examples of hybrid electric vehicles may include, but are certainly not limited to, plug-in hybrid electric vehicles (PHEVs), extended range electric vehicles (EREVs), two-mode hybrids, full hybrids, power-assist hybrids, mild hybrids, series hybrids, parallel hybrids, series-parallel hybrids, powersplit hybrids, BAS or BAS-plus hybrids, hydraulic hybrids, or any other type of hybrid vehicle. Such electric vehicles may be configured as passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any electric vehicle powertrain 10 configuration and is not limited to any particular type.

In general, the electric vehicle powertrain 10 may include a battery 12, a power controller 14, and a power plant 16. As shown in FIG. 1, in one configuration, the power plant 16 may include an engine 20, a first electric traction motor 22, a second electric traction motor 24, and a transmission 26 disposed between the first and second electric motors 22, 24. As mentioned briefly above, the power plant 16 may assume other configurations and/or arrangements, though may commonly include at least one electric motor.

In a hybrid configuration, the engine 20 may be provided in a selectively decouplable arrangement with the at least one electric traction motor. This decouplable arrangement may be provided, for example, using a clutch assembly 28 disposed in a series arrangement between the engine 20 and the first motor 22. In this manner, during propulsion of the vehicle, the mechanical output 30 of the power plant 16 may be provided in varying proportions by the engine 20, the first motor 22, and/or the second motor 24.

The battery 12 may be in electrical communication with the power controller 14 using a high voltage electrical connection 40, through which the power controller 14 may selectively receive direct current electrical power. The power controller 14 may correspondingly include one or more power inverter modules (e.g., power inverter modules 42, 44, 46) that may be configured to controllably provide electrical power to the one or more electric motors. For example, a first power inverter module 42 may supply electrical energy to the first electric motor 22, a second power inverter module 44 may supply electrical energy to the second electric motor 24, and a third power inverter module 46 may supply electrical energy to, for example, an electric fluid pump 50.

The battery 12 may be capable of storing electrical energy that is used to drive the one or more electric motors 22, 24, as well as to meet other electrical needs of the electric vehicle 10. According to an embodiment, the battery 12 may include a high-voltage battery pack (e.g., 40V-600V) and a sensor unit configured to monitor the battery state of charge (SOC). The high voltage battery pack may, for example, include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. The battery 12 may be designed to withstand repeated charge and discharge cycles and may be used in conjunction with other energy storage devices, such as capacitors, super capacitors, inductors, etc. Those skilled in the art will appreciate that battery 12 may be provided according to any number of different embodiments, may be connected in any number of different configurations, and may include any number of different components, like sensors, control units and/or any other suitable components known in the art.

The power controller 14 may act as an intermediary between the battery 12 and the electric motors 22, 24. For example, during vehicle propulsion the power controller 14 may step-up the voltage from the battery 12, and convert the current from DC to AC in order to drive the electric motors 22, 24. During regenerative braking, however, the controller 14 may step-down the voltage generated by a braking event and convert the current from AC to DC so that it can be properly stored by the battery. The power controller 14 may include an inverter for DC to AC conversion, a rectifier for AC to DC conversion, a step-up converter or transformer for increasing the voltage, a step-down converter or transformer for decreasing the voltage, other suitable energy management components, or some combination thereof. The power controller 14 may be provided according to any number of different embodiments (e.g., with separate inverter and converter units, bi-directional or uni-directional, etc.), may be connected in any number of different configurations, and may include any number of different components, such as cooling systems, sensors, control units and/or any other suitable components known in the art.

The power controller 14 may further include, or be in communication with one or more digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. Such digital electronics may be configured to automatically execute individual control/processing routines that may be stored in ROM or other suitable tangible memory locations and/or memory devices associated with the controller 14.

During vehicle propulsion, the battery 12 may provide electrical energy to the power controller 14 where it may be converted into a form suitable for the electric motors 22, 24 by the power inverter modules 42, 44. The electrical energy may then be provided to the electric motors 22, 24 for driving the wheels of the vehicle (via mechanical output 30). During regenerative braking, the electric motors 22, 24 may act as generators to provide electrical energy back to the battery 12 via the power controller 14.

Figure 3:
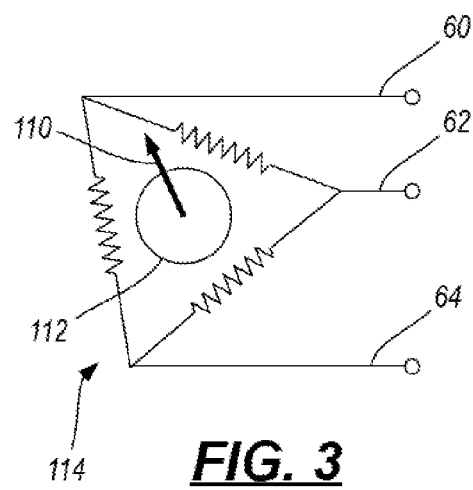
FIG. 3 is a schematic diagram of an embodiment of a three-phase electric motor.
Figure 4:
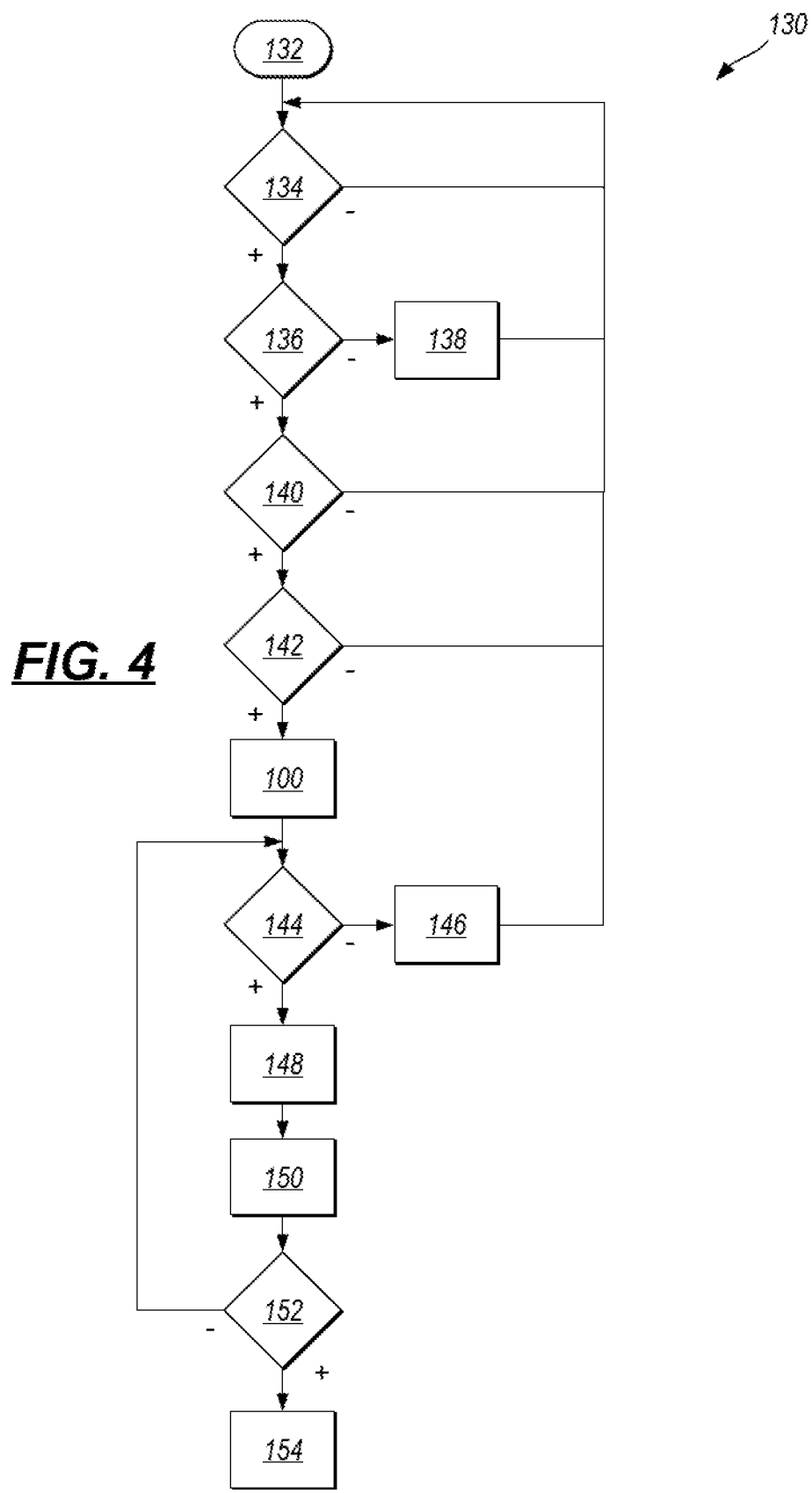
FIG. 4 is a flow diagram of a method of pre-heating an engine fluid using a three-phase electric motor of an electric vehicle powertrain.

In one configuration, the electric motors 22, 24 may be three-phase alternating current (AC) traction motors 22, 24 (such as schematically represented in FIG. 3). Each electric motor 22, 24 may have a rotor that is configured to rotate relative to a stator, with one or both of the rotor and stator including a plurality of electrical windings configured to conduct electricity. Each electric motor may be electrically coupled with a respective power inverting module using three electrical conductors (e.g., conductors 60, 62, 64), where each conductor is utilized for a different phase of the three-phase AC energy. By modulating the magnitude and/or phase of the electricity flowing through each of the three conductors 60, 62, 64, the mechanical output 30 of the power plant 16 may be selectively controlled.

To replete the discharged energy from the battery 12 following propulsion, the vehicle may include a battery charger 70 configured to receive electrical energy from one or more external electrical power sources 72. The battery charger 70 may be specifically configured to convert and/or condition the electrical energy so that it is in a suitable form for the battery 12 to receive/store. The battery charger 70 may, for example, receive electrical energy from, for example, a standard AC electrical outlet, a charging station, an external generator, or a high-voltage AC electrical outlet. To facilitate coupling with the external power source 72, the battery charger 70 may include a suitable power coupling/receptacle (not shown) that is configured to physically interconnect with the external power source 72. The charger 70 may be provided according to any number of different embodiments, may be connected in any number of different configurations, and may include any number of different components, such as transformers, rectifiers, switching power supplies, filtering means, cooling means, sensors, control units and/or any other suitable components known in the art.

The electric vehicle powertrain 10 may further include one or more fluid pumps (e.g., pump 50), that are configured to controllably pump a fluid 80 through a fluid circuit 82 in communication with the electric motors 22, 24, the transmission 26, and/or the engine 20. Excess fluid 80 may be stored in a fluid reservoir 84 provided in a series arrangement with the fluid circuit 82. During vehicle operation, the fluid 80 may be used to cool and/or lubricate various components within the electric motors 22, 24 and/or transmission 26. For example, in one configuration, the fluid 80 may be a coolant fluid, such as glycol, which may be pumped through one or more fluid passageways in thermal communication with the stator of each respective electric motor 22, 24. In another configuration, the fluid 80 may be a petroleum-based oil that may be sprayed directly onto the stator/rotor of each respective electric motor 22, 24 to cool and lubricate the windings, gearing, and/or bearings of the motors 22, 24. The fluid circuit 82 may either be a separate system from the electric motor (as with the case of a coolant), or may be integrated within the motor-transmission assembly (as with an oil sump configured to circulate oil within the motor housing).

When maintained in a cold-weather climate for a prolonged period of time without engine activity, the temperature of the fluid 80 within the fluid circuit 82 may gradually cool to the ambient atmospheric temperature. When engine/transmission oil cools, it may become more viscous, and generally increases the internal resistance of the engine. This increased resistance may then require additional battery resources to overcome. Additionally, when coolant fluid is below a designed operating temperature, the passenger cabin heating system may blow cold air, particularly because typical cabin heating systems operate by extracting heat from the engine cooling system. This delayed heating ability may prove to be undesirable to a vehicle occupant, especially on a cold morning.

To avoid the engine inefficiencies and/or passenger discomfort associated with cold engine fluid 80, the power controller 14 may be configured to pre-warm the fluid 80 using the one or more electric motors (e.g., electric motors 22, 24). The pre-warming may occur prior to the vehicle being disconnected from the external power source 72 to avoid battery depletion, and prior to any vehicle operation/propulsion. In one configuration, the pre-warming may occur upon receiving a user request via an activation module 90. In one embodiment, the user request may be a manual request, such as when a user depresses a button. In another configuration, the activation module 90 may initiate the warming process upon receipt of a wireless request 92, which may be transmitted, for example, by a user-controlled remote or key fob.

The power controller 14 may controllably heat the engine fluid 80 using the one or more electric motors, while taking care to not cause any noticeable mechanical output 30 from the power plant 16. In particular, the fluid warming may be effectuated by providing each three-phase AC motor 22, 24 with controlled direct current (DC) electrical power. In this manner, the internal resistance of the motor windings may be used to resistively warm the fluid, while the output torque of the motor may remain negligible. As illustrated in the method 100 provided in FIG. 2, and generally in the motor diagram provided in FIG. 3, this zero-torque output may be commanded by, for example, determining the angular position or magnetic field orientation 110 of the rotor 112 relative to the stator 114 (step 102); determining a DC current for each of the three motor phases such that the resultant electromagnetic field of the stator is aligned with the magnetic field of the rotor (step 104); and providing the calculated DC currents to the motor via the electrical conductors (e.g., conductors 60, 62, 64) (step 106). In this manner, the electromagnetic field of the stator will exactly mirror the magnetic field of the rotor, thus causing a mutual attraction with no net torque.

Referring again to FIG. 1, while the electric motor is energized with a DC current, the power controller 14 may activate the fluid pump 50 to circulate fluid 80 about the motor(s). At the same time, the power controller 14 may monitor the temperature of the fluid 80 using a temperature sensor 120, such as a thermocouple or thermistor. As the one or more motor(s) are energized, the generated heat may be received by the circulated fluid 80, and may cause the temperature of the fluid to rise. Additionally, the power controller 14 may bypass any fluid cooling devices, such as heat exchangers or radiators that may transfer thermal energy from the fluid 80 to the environment. The resistive fluid pre-warming may then decrease or turn off as the sensed temperature of the fluid reaches a predefined threshold. For example, as with engine oil, the predefined threshold may be in the range of 70-90 degrees Celsius.

To prevent the fluid-warming routine from depleting the energy stored in the battery 12, the power controller 14 may only activate the fluid-warming routine when it is sensed that the vehicle is coupled with the external power supply 72. This may allow the operating systems and fluids to be brought up to the most efficient operating temperatures without sacrificing vehicle range or charge.

Since the pre-warming may occur when the vehicle is unattended, the power controller 14 may continuously monitor the mechanical output 30 of the power plant 16 to avoid any unintended motion. For example, the power controller 14 may continuously monitor the angular motion of each motor 22, 24, the angular motion of the transmission 26, and whether the parking pawl has been engaged by a transmission shift selector 122 (i.e., whether the vehicle is in "park"). In this manner, the power controller 14 may terminate the pre-warming routine if any mechanical output 30 from the power plant 16 is detected, or possible to occur.

Figure 2:
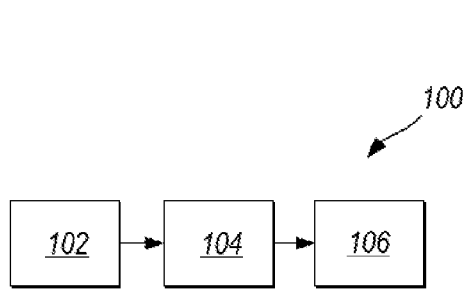
FIG. 2 is a flow diagram of a method of energizing a three-phase electric motor with a DC current.

FIG. 3 illustrates an embodiment of a method 130 for pre-warming a fluid 80 within an electric vehicle powertrain 10 by commanding a zero-torque DC output of an electric motor, such as described in the method 100 provided in FIG. 2. The method 130 may be embodied as an algorithm that may be performed or executed by the power controller 14, or by another digital controller/processor associated with the power controller 14.

The method 130 may begin at step 132 with the vehicle in a powered-off state, wherein the controller 14 may then inquire whether the charger 70 is coupled with an external power source 72 (step 134). The coupling may be detected, for example, by internal sensory circuits of the charger and may be conveyed to the power controller 14 via a data connection between the controller 14 and the battery 12 and/or charger 70. It should be noted that within FIG. 1, data/sensory connections are schematically represented in phantom.

If the power controller 14 determines that the charger 70 is coupled with an external power source 72 in step 134, it may then inquire whether the state of charge (SOC) of the battery 12 is above a predetermined charging threshold in step 136. The charging threshold may represent an ideal maximum starting charge for the battery 12, which may be less than 100%. If the SOC is not at or above the threshold, the charger 70 may divert all available energy into further charging the battery 12 (step 138). If the SOC is, however, at or above the charging threshold, the controller 14 may wait for a pre-warmer activation command (step 140), which may be provided, for example, by the activation module 90.

Once an activation command is recognized in step 140, the controller 14 may inquire from the transmission 26 whether the parking pawl is engaged before energizing the electric motor(s). If the pawl is not engaged, the system may terminate the warming routine, or else continue to make the above-mentioned inquiries until it detects that the pawl has been engaged. If the controller 14 detects that the parking pawl is properly set in step 142, it may then energize the one or more electric motors with a DC current as described in the method 100 illustrated in FIG. 2.

Following the energizing of the motors, the controller 14 may examine the power plant 16 for any perceived motion (step 144). For example, the controller 14 may poll sensors/encoders disposed within the motors or in communication with the output of the motors to detect changes in absolute angular position. Alternatively, the controller 14 may examine the supplied DC power for ripples, fluctuations, or other signal artifacts that may be generated by back-EMF attributable to an angular motion of the rotor. If any motion or electrical supply-irregularities are detected, the controller may immediately eliminate the power supply to the one or more motors (step 146).

If no motion is detected in step 144, the controller 14 may then energize a fluid pump (step 148), such as pump 50, to circulate the fluid 80 through the circuit 82 associated with the energized motor(s). In this manner, the windings of the motor may act as resistive heaters to increase the temperature of the fluid 80. While the fluid is being circulated, a temperature sensor 120 may monitor the increasing temperature of the fluid 80 (step 150). The controller 14 may then compare the sensed fluid temperature to a predetermined temperature threshold in step 152 to determine whether the fluid has been sufficiently heated. If the sensed fluid temperature exceeds the threshold, the power supplied to the one or more motors may be reduced or eliminated (step 154). If the fluid temperature is still colder than the desired threshold, the method 130 may continue to monitor the power plant 16 for motion while heating the fluid until the threshold is met.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An electric vehicle powertrain comprising:
   a battery configured to couple with an external power source;
   a power plant including at least one three-phase electric motor, the electric motor including a stator having a plurality of electrical windings and a rotor having a magnetic field orientation, the rotor configured to rotate relative to the stator;
   a power controller configured to receive electrical energy from the battery and to provide electrical energy to the at least one electric motor in a controlled manner;
   wherein the power controller is configured to determine the position of the rotor relative to the stator, to determine a DC current for each of the three motor phases such that the electromagnetic field of the stator mirrors the magnetic field orientation of the rotor; and to provide the determined DC currents to the electric motor;
   wherein the electric vehicle powertrain further comprising a fluid circuit in communication with the electric motor, the fluid circuit including a fluid pump configured to circulate a fluid within the fluid circuit, and wherein the power controller is configured to provide electrical energy to the fluid pump; and
   wherein the respective DC currents provided to the electric motor are configured to resistively heat the fluid within the fluid circuit.

2. The electric vehicle powertrain of claim 1, further comprising a temperature sensor in thermal communication with the fluid circuit and configured to monitor a temperature of the fluid; and
   wherein the power controller is configured to provide the respective DC currents to the electric motor only if the sensed temperature is below a predefined threshold.

3. The electric vehicle powertrain of claim 1, wherein the fluid includes a coolant fluid or an engine oil.

4. The electric vehicle powertrain of claim 1, wherein the power controller is configured to monitor a state of charge of the battery; and
   wherein the power controller is configured to provide the respective DC currents to the electric motor only if the state of charge of the battery is above a predefined threshold.

5. The electric vehicle powertrain of claim 1, wherein the three-phase electric motor is an electric traction motor, and wherein the electric traction motor is coupled with a transmission.

6. A method of pre-warming an engine fluid comprising:
   determining an angular position of a rotor relative to a stator, the rotor and stator belonging to a three-phase electric traction motor of an electric vehicle powertrain;
   determining a DC current for each of the three electrical phases of the three-phase electric traction motor such that the magnetic field of the stator mirrors the magnetic field of the rotor; and
   providing each determined DC current to the respective phase of the electric traction motor;
   pumping the engine fluid into thermal communication with the three-phase electric traction motor.

7. The method of claim 6, further comprising:
   monitoring the angular position of the rotor; and
   removing the supply of DC current to the electric motor if a change in angular position is detected.

8. The method of claim 6, further comprising:
   monitoring a temperature of the engine fluid using a temperature sensor; and
   removing the supply of DC current to the electric motor if the temperature is greater than or equal to a threshold.

9. The method of claim 6, wherein the engine fluid is an engine oil; and wherein pumping the engine fluid into thermal communication with the three-phase electric traction motor includes spraying the engine oil onto the rotor.

10. The method of claim 6, wherein the engine fluid is a coolant, and wherein pumping the engine fluid into thermal communication with the three-phase electric traction motor includes flowing the coolant through a conduit associated with the motor.

11. The method of claim 6, further comprising receiving an activation request prior to providing the determined DC currents to the respective phases of the electric traction motor.

12. The method of claim 6, further comprising determining if the electric vehicle powertrain is coupled with an external power source prior to providing the determined DC currents to the respective phases of the electric traction motor.

13. A method of pre-warming an engine fluid comprising:
   receiving an activation request;
   comparing a state of charge of a battery to a charging threshold;
   energizing a three-phase electric traction motor with a DC current in response to the activation request, if the state of charge of the battery exceeds the charging threshold;

transferring thermal energy from the three-phase electric traction motor to the engine fluid.

14. The method of claim 13, wherein energizing a three-phase electric traction motor with a DC current does not induce an output torque of the motor.

15. The method of claim 13, wherein energizing a three-phase electric traction motor with a DC current includes:
    determining the angular position of a rotor of the traction motor relative to a stator of the electric traction motor;
    determining a DC current for each of the three electrical phases of the three-phase electric traction motor such that the magnetic field of the stator mirrors the magnetic field of the rotor; and
    providing each determined DC current to the respective phase of the electric traction motor.

16. The method of claim 15, further comprising:
    monitoring an angular position of the rotor; and
    removing the supply of DC current to the electric traction motor if a change in angular position is detected.

17. The method of claim 13, wherein transferring thermal energy from the three-phase electric traction motor to the engine fluid includes pumping the engine fluid into thermal communication with the three-phase electric traction motor.

18. The method of claim 17, further comprising:
    monitoring a temperature of the engine fluid using a temperature sensor; and
    removing the supply of DC current to the electric traction motor if the temperature is greater than or equal to a threshold.

* * * * *